United States Patent Office 3,708,530
Patented Jan. 2, 1973

3,708,530
BENZYLHALIDE CARBONYLATION PROCESS
Bernard S. Friedman, Chicago, Ill., assignor to Atlantic Richfield Company, New York, N.Y.
No Drawing. Filed Jan. 5, 1970, Ser. No. 820
Int. Cl. C07c 63/52, 63/56
U.S. Cl. 260—515 P          19 Claims

ABSTRACT OF THE DISCLOSURE

A process for the manufacture of aromatic carboxylic acids comprising reacting a benzylic halide which contains substituents in such positions that self-alkylation (polymerization) of the halide is blocked, with carbon monoxide at a temperature of about 20 to 150° C.

---

This invention relates to a process for the synthesis of carboxymethyl derivatives of aromatic compounds. In particular, the invention relates to a process for the production of aromatic carboxylic acids by the carboxylation of benzylic halides. More particularly, the invention relates to a process for the production of aromatic mono-, di-, tri-, tetra-, penta-, and hexa-carboxylic acids by the carboxylation of benxylic mono-, di-, tri-, tetra-, penta- and hexa-halides.

The reaction of alkyl and cycloalkyl halides with carbon monoxide to yield organic acids is known in the art. However, the direct carboxylation of benzylic halides is not generally known since the prior attempts to directly react carbon monoxide with a benzyl halide have resulted in the self-alkylation (polymerization) of the benzyl halides. This reaction is generally considered to proceed as:

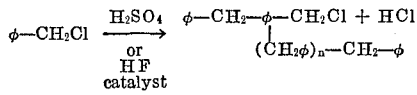

wherein $\phi$ represents the aromatic ring.

The production of benzyl carboxylic acids has been accomplished by, for example, the carboxylation of benzyl Grignard reagents, which can be formed from the benzyl halides by treatment with magnesium. These acids can also be synthesized by the condensation of a halocarboxylic acid (e.g. chloroacetic acid) with aromatic nuclei in the presence of aluminum chloride. Other methods are also known to those skilled in the art but, as noted, none of these methods provides for the direct carboxylation of benzyl halides, e.g., without the necessary formation of intermediate reactants.

It has now been found that certain benzyl halides, further defined hereinbelow, which contain substituents in positions such that self-alkylation (polymerization) is blocked, will react with carbon monoxide at a temperature of about 20 to 150° C., preferably about 30 to 100° C., to produce the benzyl carboxlic acid. The reaction is run in the presence of an effective amount of a catalyst which can be, e.g., from about 1 to 100 moles, preferably 10 to 25 moles, per mole of benzylic halide, of a suitable catalyst such as HF, $H_2SO_4$ or $BF_3$. When $BF_3$ is used as a catalyst, co-catalysts such as $H_2O$, $H_2SO_4$ or $H_3PO_4$ can be present. The HF may contain 0 to about 20% water but 0 to about 5% is preferred. The concentration of the $H_2SO_4$ may often range from about 85–100%; about 95–98% is preferred. The reaction is run at any suitable pressure of carbon monoxide, for instance, about atmospheric to 5000 p.s.i., preferably about 500 to 2000 p.s.i. The product of the reaction can be recovered from the reaction medium by quenching and extraction with a suitable solvent, such as an alkali solution or ether. The benzyl carboxylic acids are often recovered directly from the solution but can be present in an easily hydrolyzable form, e.g., as the acid fluoride. Hydrolysis of the acid fluoride is easily performed, as is known in the art, to recover the benzyl carboxylic acid.

The benzylic halide starting material can be a benzylic mono-, di-, tri-, tetra-, penta- or hexa-halide and contains substituents on the ring in such a manner as to block the self-alkylation reaction noted before. This material can be, for example, one in which there are no unsubstituted positions on the ring or one in which the open ring positions, if present, are deactivated by the presence of a negative, e.g., electron-withdrawing, group on the ring elsewhere, or it can be one in which each open position is flanked by two secondary alkyl groups, i.e., ones in which the alpha-carbon atom contains only one hydrogen atom.

A benzylic halide in which there are no vulnerable positions on the aromatic ring can be, for example, bis-chloromethyldurene or tris-chloromethylmesitylene. The benzylic halide can also be any of the (n-chloro)hexa-lower alkyl-benzene compounds in which a lower alkyl group, e.g., containing from about 1 to 5 carbon atoms, is substituted at each corner of the ring and $n$ is the number of the lower alkyl groups which contains a chlorine substituent and further wherein $n$ can be from 1 to 6. The benzylic halide can, thus for example, be 1-chloromethyl-2,3,4,5,6 - pentamethylbenzene or 1,3 - dichloromethyl-2,4,5,6 - tetraisopropylbenzene. Halogen groups can also be added on the aromatic ring at the positions between the haloalkyl substituents, as, for example, 2,3,5,6-tetrachloro-1,4-bischloromethylbenzene.

A benzylic halide in which the open ring positions are deactivated by the presence of a negative group or a group which becomes negative in the presence of the acidic catalyst, can be, for example, of the general formula:

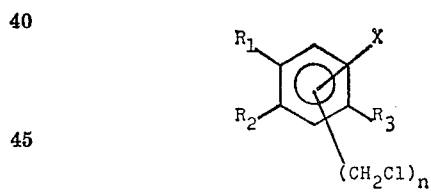

wherein $n$ is from 1 to 5, X is taken from one of the groups consisting of —COOH, —$NH_2$, —NHR, —$NR_2$, NHAc, —RC=O, —COOR, —$NO_2$, —$SO_3H$ and —$SO_2R$ (where R can be a non-reactive hydrocarbon group such as alkyl, cycloalkyl or blocked or deactivated aryl, e.g. of up to about 12 or more carbon atoms); $R_1$ is H, halogen, R or X; and $R_2$ and $R_3$ are H, halogen or R. The groups —$NH_2$, —NHR and —$NR_2$ shown above as X are generally considered electron-donating groups but become negative, or electron-withdrawing, in the presence of the acidic catalyst. In the above formula, X can also be a halogen when $R_1$ is halogen. Chlorine is the preferred halogen.

A benzylic halide in which each open position is flanked by two secondary alkyl groups can be, for example, any of the chloromethyl benzene and chloromethyl lower-alkyl substituted benzenes having up to about 24, preferably up to 12 carbon atoms, and in which any unsubstituted carbon atom of the ring has both adjacent carbon atoms bearing a secondary lower alkyl substituent.

The acids produced by the direct carboxylation of a benzylic halide of the types described above, and particularly the polybasic acids which can be formed, are useful for synthesizing polyesters suitable for plasticizers, coatings and fibers.

The invention will be further illustrated by the following examples.

EXAMPLE I

A solution of 41 g. (0.177 mole) of bis-chloromethyldurene (A) in 750 ml. of chloroform was charged over a period of 48 minutes to a stirred autoclave containing 157.5 g. (7.8 moles) of anhydrous HF and 1040 p.s.i.g. of carbon monoxide. The temperature remained at 24° C. during this period. Heat was applied and the autoclave stirred 2.5 hours at 28–30° after which the contents were discharged onto precooled (−80°) ice. Extraction with alkali, acidification and the recrystallization from 150 parts of hot acetic acid afforded considerable white solid identified as the dicarboxylic acid (B) by NMR and C, H analysis: Percent C=66.66 (67.18 theor.); percent H= 7.30 (7.25 theor.). The reaction is shown by:

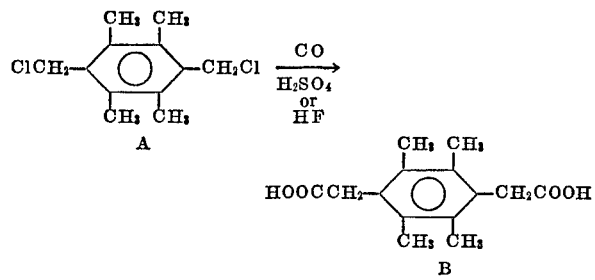

EXAMPLE II

The same product as in Example I was obtained, although in lower yield, by the same procedure as in Example I utilizing 100 grams of concentrated sulfuric acid as the catalyst instead of HF.

EXAMPLE III

A solution of 26.5 g. (0.1 mole) of tris-chloromethylmesitylene (C) in 560 g. chloroform was pressured gradually over a period of 35 minutes into a stirring autoclave containing 135 g. (6.8 moles) of anhydrous HF, 300 g. of chloroform and 1280 p.s.i.g. of CO kept at 20–21° C. Stirring was continued for 2.5 hours at 30–32°. Workup of the product as in Example I afforded approximately 80% of a material identified by IR as the tris-acylfluoride of (D) and a few grams of light yellow needles, M.P. 288–289° (dec.) identified as the tribasic acid (D) by NMR and IR. The acid fluoride can be readily hydrolyzed to form the acid. The overall reaction is shown by:

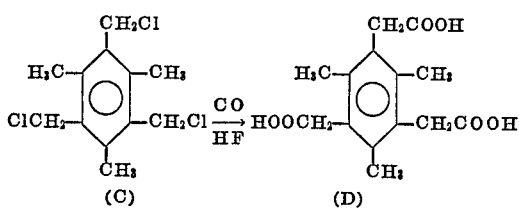

EXAMPLE IV

A solution of 9.2 g. (0.05 mole) of 4-methyl-3-chloromethylbenzoic acid in 600 ml. of chloroform was charged over a period of 43 minutes to a stirring autoclave containing 100 g. (5 moles) of HF and 200 ml. of chloroform and 1300 p.s.i.g. of CO at 32–36° C. Sample (a) was taken after 1 hour of stirring at 38°, and sample (b) after stirring 0.5 hour more at 65°. Quenching and extraction with alkali afforded a high yield of product identified by IR as 4-methyl-3-carboxymethylbenzoic acid from sample (b). Analysis of sample (a) indicated the absence of 4-methyl-3-carboxymethylbenzoic acid.

EXAMPLE V

A solution of 0.1 mole of 2,4,6-triisopropylbenzylchloride in n-pentane is charged over a period of 30 minutes to a stirred autoclave containing 100 g. of $BF_3 \cdot H_2O$ and 1000 p.s.i.g. of carbon monoxide. The temperature is maintained at 25–30° C. during this period and during subsequent stirring for 2 hours. Quenching with ice-water and extraction with ether and the ether with alkali affords 2,4,6-triisopropylcarboxymethylbenzene in good yield.

What is claimed is:

1. The process for the direct carboxylation of benzylic halides which comprises reacting a benzylic halide which contains a substituent selected from the group consisting of —COOH, —$NH_2$, —NHR, —$NR_2$, —NHAc, —RCO, —COOR, —$NO_2$, —$SO_3H$, and —$SO_2R$, where R can be alkyl, cycloalkyl or aryl, positioned such that self-alkylation of the halide is blocked, with carbon monoxide at a temperature of from about 20 to 150° C. in the presence of a catalytically effective amount of HF, $H_2SO_4$ or $BF_3$ and recovering an aromatic carboxylic acid.

2. The process of claim 1 wherein the temperature is from about 30 to 100° C.

3. The process of claim 2 wherein the pressure is from about 500 to 2000 p.s.i.g.

4. The process of claim 3 wherein the reaction is run in the presence of from about 1 to 100 moles of catalyst per mole of benzylic halide.

5. The process of claim 4 wherein the reaction is run in the presence of from about 10 to 25 moles of catalyst per mole of benzylic halide.

6. The process for the direct carboxylation of benzylic halides which comprises reacting a hexa-lower alkyl benzene halide with carbon monoxide at a temperature of about 20 to 150° C. in the presence of a catalytically-effective amount of HF, $H_2SO_4$ or $BF_3$ and recovering an aromatic carboxylic acid.

7. The process of claim 6 wherein the pressure is from about 30 to 100° C.

8. The process of claim 7 wherein the pressure is from from about 500 to 2000 p.s.i.g.

9. The process of claim 8 wherein the reaction is run in the presence of from about 1 to 100 moles of catalyst per mole of benzylic halide.

10. The process of claim 9 wherein the reaction is run in the presence of from about 10 to 25 moles of catalyst per mole of benzylic halide.

11. The process of claim 6 wherein the benzylic halide is (n-chloro)hexa-lower alkyl-benzene where the lower alkyl group has from about 1 to 5 carbon atoms, where $n$ is the number of alkyl groups which contain a chlorine substituent, and where $n$ is a number from 1 to 6.

12. The process of claim 11 wherein the benzylic halide is bis-chloromethyldurene.

13. The process of claim 11 wherein the benzylic halide is tris-chloromethylmesitylene.

14. The process of claim 11 wherein the benzylic halide is 1-chloromethyl-2,3,4,5,6 pentamethyl benzene.

15. The process for the direct carboxylation of benzylic halides which comprises reacting a benzylic halide having each open position in the benzylic halide flanked by secondary alkyl groups, with carbon monoxide at a temperature of about 20 to 150° C. in the presence of a catalytically-effective amount of HF, $H_2SO_4$ or $BF_3$ and producing an aromatic carboxylic acid.

16. The process of claim 15 wherein the temperature is from about 30 to 100° C.

17. The process of claim 16 wherein the pressure is from about 500 to 2000 p.s.i.g.

18. The process of claim 17 wherein the reaction is run in the presence of from about 1 to 100 moles of catalyst per mole of benzylic halide.

19. The process of claim 18 wherein the reaction is run in the presence of from about 10 to 25 moles of catalyst per mole of benzylic halide.

References Cited

UNITED STATES PATENTS

| | | | |
|---|---|---|---|
| 2,565,464 | 8/1951 | Tabet | 260—475 |
| 2,691,670 | 10/1954 | Tabet | 260—465 |
| 3,127,438 | 3/1964 | Friedman et al. | 260—468 |
| 3,636,082 | 1/1972 | Knowles | 260—475 |

OTHER REFERENCES

Friedman et al.: J. Org. Chem., vol. 27 (1962), pp. 481–7.

Nesmeyanov et al.: Chem. Abstracts, vol. 70 (1969), p. 68487g.

JAMES A. PATTEN, Primary Examiner

U.S. Cl. X.R.

260—475 SC, 507 R, 515 A, 515 M, 515 R, 518 A, 518 R, 649 R